No. 613,657. Patented Nov. 8, 1898.
C. W. H. BLOOD.
SELF OILING LOOSE PULLEY.
(Application filed Oct. 1, 1895.)
(No Model.)
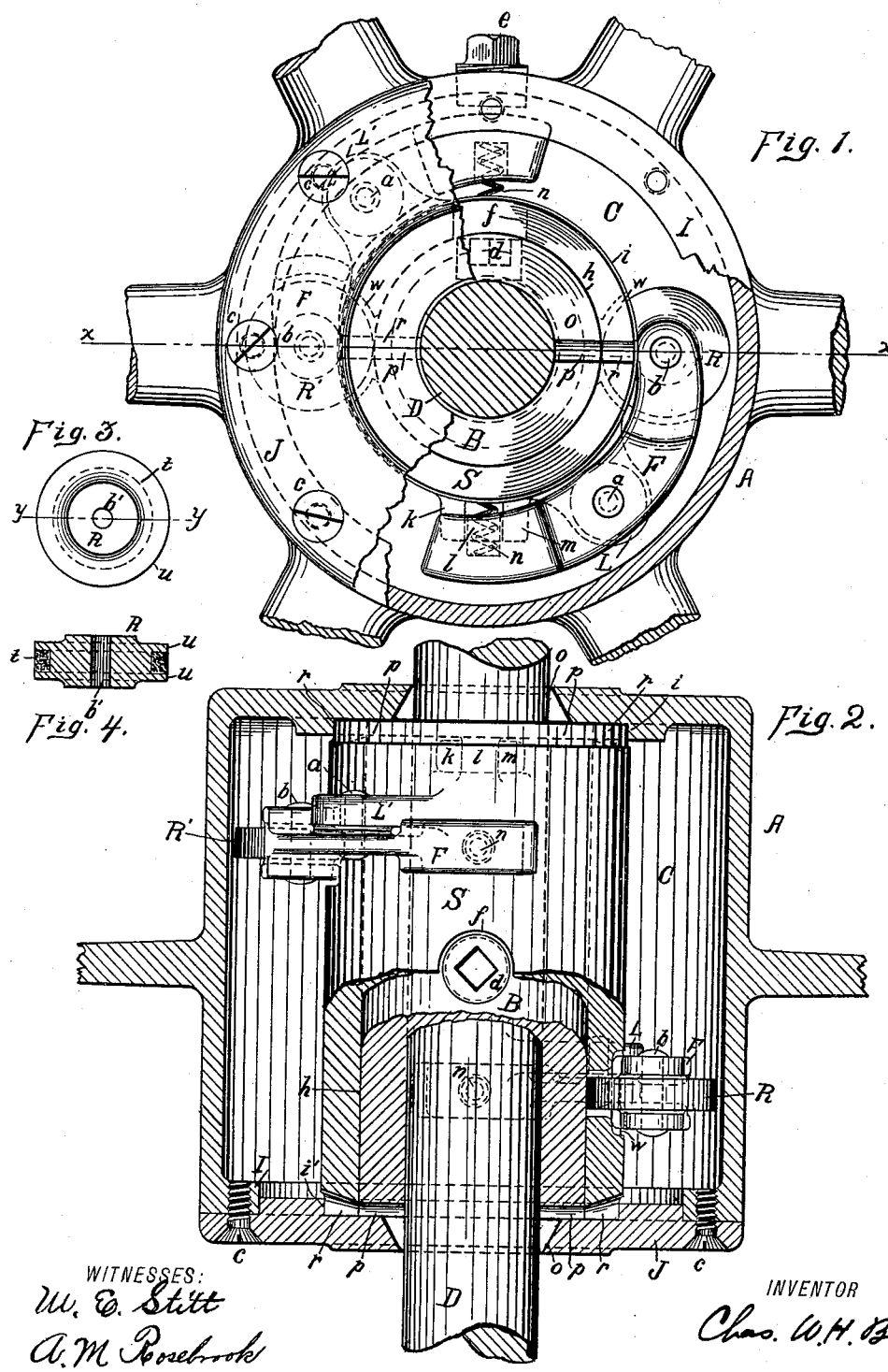
WITNESSES:
W. E. Stitt
A. M. Rosebrook
INVENTOR
Chas. W. H. Blood.

UNITED STATES PATENT OFFICE.

CHARLES W. H. BLOOD, OF BOSTON, MASSACHUSETTS.

SELF-OILING LOOSE PULLEY.

SPECIFICATION forming part of Letters Patent No. 613,657, dated November 8, 1898.

Application filed October 1, 1895. Serial No. 564,339. (No model.)

*To all whom it may concern:*

Be it known that I, CHARLES W. H. BLOOD, a citizen of the United States, and a resident of Boston, in the county of Suffolk and State of Massachusetts, have invented certain new and useful Improvements in Self-Oiling Loose Pulleys, of which the following, taken in connection with the accompanying drawings, is a specification.

My invention relates to loose pulleys having an annular oil reservoir or chamber in the hub. When such a pulley is in motion, the oil in the reservoir or chamber is caused by centrifugal force to keep against the outer wall thereof; and the objects of my invention are, first, to provide means for continuously feeding the oil to the bearing-surfaces to be lubricated, and, second, to provide means for the return to the oil chamber or reservoir of any surplus oil fed to the bearing. I attain these objects by the means illustrated in the accompanying drawings, in which—

Figure 1 is an end elevation of the pulley-hub containing the reservoir, part of the detachable end cover being broken away therefrom to more clearly show the interior. Fig. 2 is a longitudinal section of the hub, taken on the line X X of Fig. 1. Figs. 3 and 4 are a side elevation and a section on the line Y Y, respectively, of a modification of the oil-feeding roller R.

Similar letters refer to similar parts throughout the views.

Referring to Figs. 1 and 2, A is the hub of the pulley, cored out in such a manner as to form within it an annular chamber or reservoir C, entirely surrounding the bore and serving as a reservoir to contain oil or other lubricating liquid.

Within the reservoir C is an inner shell S, concentric with the supporting-shaft D and bored out to form the internal bearing of the pulley. The inner bearing of this shell may revolve upon the supporting-shaft D directly; but I prefer to revolve it upon an enlargement thereof produced either integrally with the shaft or by a bushing B, as shown, which may be fastened to the shaft in any approved manner, as by the socket set-screw *d*.

When the pulley is in motion, the centrifugal force imparted to the oil in the reservoir throws it outwardly, causing it to be distributed in an even layer against the inner surface of the reservoir. To carry this lubricant to the bearing-surfaces, I employ one or more rollers R, supported by arms F, pivoted at *a* upon lugs L, cast upon the inner shell S. The shell S is cut away at *w* through to its bore to permit the roller R to come in contact with the bearing-surface upon the supporting-shaft. Sufficient pressure is given to the roller upon this point of contact to cause it to revolve when the pulley turns upon its bearing, and the oil adhering to the roller by its contact with the outlying layer against the inner wall of the reservoir is thus carried to the bearing-surfaces.

The pivoted arm F, supporting the roller R, is carried beyond its pivoted point *a* and there enlarged sufficiently to form a counterweight to the roller to prevent the latter from being thrown from its point of contact with B by centrifugal force. This tendency is further counteracted and means provided whereby any desired pressure may be given upon the roller by the introduction of a spring *n* between the enlarged end of F and the shell S. Any other method of supporting this roller may be used without departing from the spirit of my invention.

To insure the better conveyance of the lubricant by the roller R, I may employ the modification shown in Figs. 3 and 4. A groove is turned in the periphery of the roller, leaving the outer edges of said roller at *u* of full diameter to form the surfaces for the rolling contact with the bearing-surface of the shaft *h*, said groove being filled with felt or other absorbent material.

The sleeve S is preferably made detachable from the reservoir-casing or the hub, being shouldered into the same at one end and into a detachable cover-plate J at the other at the joints *i i'*, the lugs *k l m* being provided to prevent the sleeve S from turning in its seat, *k* and *m* being part of the reservoir-casing and *l* part of the sleeve made to fit in between *k* and *m*.

The end walls of the reservoir, one of them being the detachable cover-plate J, are cupped inwardly concentric with the supporting-shaft, forming the recesses *o o'*. In the ends of the bushing B and the sleeve S are one or more radial grooves *p* and *r*, respectively forming communication between the cupped recesses o o' and the interior reservoir C, whereby any lubricant that may work out at the ends of the bearing will be collected in the aforesaid cupped recesses and returned to the reservoir.

Through the sleeve S is a circular opening f, radially opposite the screw-plug e in the outer wall of the reservoir and in the plane of rotation of the socket set-screw d, whereby the latter may be tightened or removed by the introduction of a suitable wrench when the plug e is removed, which also provides means for the introduction of oil into the reservoir.

What I claim as my invention, and desire to secure by Letters Patent, is—

1. The combination of a self-oiling loose pulley and a supporting-shaft therefor, an oil reservoir or chamber in the hub, one or more supports within said reservoir, oil-conveying rollers connected to said supports, said rollers bearing upon the supporting-shaft and caused to rotate by contact therewith, substantially as described and set forth.

2. A loose pulley and a supporting-shaft therefor, an oil reservoir or chamber in the hub, one or more oil-conveying rollers mounted therein self-adjusting supports, upon which said rollers are mounted, said supports and rollers revolving coincidently with the pulley about the pulley-axis, said roller or rollers being adapted to bear upon the pulley-journal and caused to rotate independently by contact therewith, substantially as specified and for the purpose set forth.

3. A loose pulley having an oil reservoir or chamber in the hub, a sleeve contained therein, the pulley-bearing contained within said sleeve, oil-conveying rollers mounted within the aforesaid reservoir, there being passages through the sleeve to permit the passage of said rollers to the inner bearing of the pulley substantially as specified and set forth.

4. A loose pulley having an oil reservoir or chamber in the hub, an inner shell contained therein, oil-conveying rollers passing through openings in said shell, and means for applying pressure to said rollers, substantially as specified and for the purpose set forth.

5. A loose pulley having an oil reservoir or chamber in the hub, an inner shell contained therein, oil-conveying rollers mounted upon said shell and adapted to bear upon the pulley-journal, and means for applying pressure to the same, for the purpose specified and set forth.

6. A loose pulley having an oil reservoir or chamber in the hub, a detachable sleeve bored to form the pulley-bearing contained therein and oil-conveying rollers mounted upon said sleeve substantially as specified and set forth.

7. A loose pulley having an oil reservoir or chamber in the hub, an inner sleeve bored for the pulley-bearing contained therein, one or more oil-conveying rollers mounted upon said sleeve and adapted to bear upon the supporting-shaft, said rollers being provided with circumferential grooves adapted to be filled with felt or other absorbent material, the parts of the rollers adjacent to said grooves being adapted to bear upon the supporting-shaft thereby revolving the rollers, substantially as specified and for the purpose set forth.

In testimony whereof I have signed my name to this specification, in the presence of two subscribing witnesses, on this 16th day of September, A. D. 1895.

CHARLES W. H. BLOOD.

Witnesses:
   JAMES CONLEY,
   JOHN HOOD.